United States Patent
Baranowski et al.

(10) Patent No.: US 11,571,997 B2
(45) Date of Patent: Feb. 7, 2023

(54) SEAT COMPONENT FOR A VEHICLE SEAT AND VEHICLE SEAT

(71) Applicant: Ford Global Technologies, LLC, Dearborn, MI (US)

(72) Inventors: Thomas Baranowski, Würselen (DE); Jessica Rebecca Rausch, Moenchengladbach (DE); Volker Scheer, Roetgen (DE); Maximilian Engelke, Aachen (DE); Marcel Mathissen, Übach-Palenberg (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/493,970

(22) Filed: Oct. 5, 2021

(65) Prior Publication Data

US 2022/0134921 A1 May 5, 2022

(30) Foreign Application Priority Data

Oct. 29, 2020 (DE) .......................... 102020213641.6

(51) Int. Cl.
*A47C 31/00* (2006.01)
*B60N 2/56* (2006.01)

(52) U.S. Cl.
CPC ......... *B60N 2/5635* (2013.01); *B60N 2/5657* (2013.01); *B60N 2/5685* (2013.01)

(58) Field of Classification Search
CPC .......... A47C 7/74; B60N 2/5657; B60N 2/56; B60N 2/5635; B60N 2/5642
See application file for complete search history.

(56) References Cited

U.S. PATENT DOCUMENTS

| 2,141,271 | A | * | 12/1938 | Gerlofson | A47C 7/74 5/717 |
| 5,004,294 | A | * | 4/1991 | Lin | B60N 2/5628 297/180.13 |
| 6,581,225 | B1 | * | 6/2003 | Imai | A61G 7/05784 5/652.2 |
| 6,687,933 | B2 | * | 2/2004 | Habboub | A61G 5/1045 297/452.42 |
| 7,278,179 | B2 | * | 10/2007 | Schneider | F16K 15/147 5/713 |

(Continued)

FOREIGN PATENT DOCUMENTS

| DE | 202006016873 U1 | 3/2007 |
| DE | 202015100495 U1 | 4/2015 |

*Primary Examiner* — Shin H Kim
(74) *Attorney, Agent, or Firm* — Vichit Chea; Price Heneveld LLP

(57) ABSTRACT

A seat component for a vehicle seat having at least one air outlet unit configured to be connected to an air supply. In order to be able to adapt a ventilation function of the vehicle seat individually to a contact area between the vehicle seat and a person sitting thereon, the air outlet unit has at least one flexible air guide funnel and at least one diaphragm valve which is arranged within the at least one flexible air guide funnel and which is connected to the at least one flexible air guide funnel in such a way that the diaphragm valve closes the air guide funnel when the air guide funnel is not deformed, and at least partially opens the air guide funnel when the air guide funnel is deformed.

17 Claims, 2 Drawing Sheets

(56) References Cited

U.S. PATENT DOCUMENTS

| | | | | |
|---|---|---|---|---|
| 7,461,892 B2* | 12/2008 | Bajic | | B60N 2/5664 297/452.47 |
| 7,832,798 B2* | 11/2010 | Bajic | | A47C 7/72 297/452.47 |
| 7,918,498 B2* | 4/2011 | Bajic | | B60N 2/5664 297/180.12 |
| 8,235,462 B2* | 8/2012 | Bajic | | A47C 7/744 297/452.47 |
| 10,046,683 B2* | 8/2018 | Line | | B60N 2/7094 |
| 10,919,633 B1* | 2/2021 | Wilson | | B60N 2/5628 |
| 11,318,869 B2* | 5/2022 | Greenwood | | B60N 2/5657 |
| 11,433,790 B2* | 9/2022 | Noh | | B60N 2/5657 |
| 2005/0173950 A1* | 8/2005 | Bajic | | A47C 7/74 297/452.45 |
| 2006/0010607 A1 | 1/2006 | Schneider | | |
| 2007/0035162 A1* | 2/2007 | Bier | | B60N 2/5635 165/138 |
| 2009/0284052 A1* | 11/2009 | Bajic | | A47C 7/744 297/180.1 |
| 2010/0253117 A1* | 10/2010 | Bajic | | B60N 2/5664 297/180.12 |
| 2011/0260509 A1* | 10/2011 | Siu | | B60N 2/565 297/180.14 |
| 2014/0001277 A1* | 1/2014 | Arnold | | B05B 7/10 239/422 |
| 2015/0008716 A1* | 1/2015 | Dry | | B60N 2/565 297/452.38 |
| 2017/0080838 A1* | 3/2017 | Dry | | B60N 2/643 |
| 2018/0022252 A1* | 1/2018 | Arata | | B60N 2/565 297/452.42 |
| 2020/0361276 A1* | 11/2020 | Bima | | B62J 33/00 |
| 2021/0039791 A1* | 2/2021 | Wilson | | B60N 2/5635 |
| 2021/0102733 A1* | 4/2021 | Stahl | | B60N 2/5657 |
| 2021/0300218 A1* | 9/2021 | Greenwood | | B60N 2/5657 |
| 2021/0402899 A1* | 12/2021 | Noh | | A47C 7/74 |
| 2022/0134921 A1* | 5/2022 | Baranowski | | B60N 2/5642 297/180.13 |

* cited by examiner

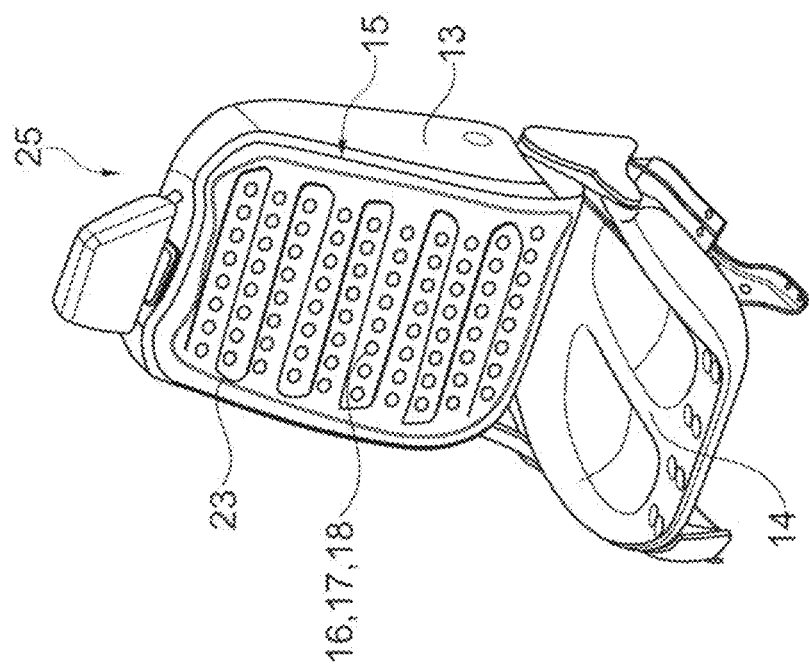
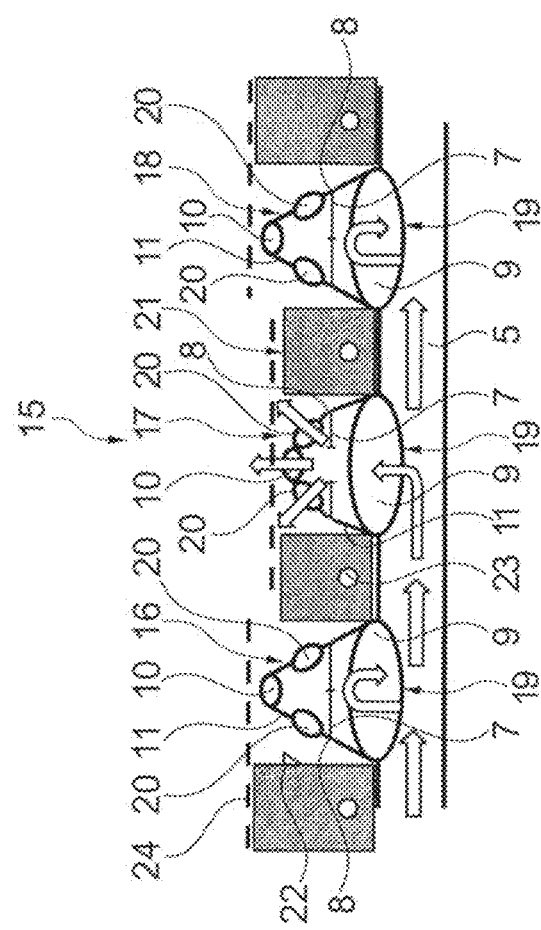
Fig. 4
Fig. 3

SEAT COMPONENT FOR A VEHICLE SEAT AND VEHICLE SEAT

CROSS-REFERENCE TO RELATED APPLICATION

This application claims foreign priority benefits under 35 U.S.C. § 119(a)-(d) to German Application No. 102020213641.6 filed Oct. 29, 2020, which is hereby incorporated by reference in its entirety.

FIELD OF THE DISCLOSURE

The present disclosure generally relates to a vehicle seat, and more particularly relates to a seat component having at least one air outlet unit which can be connected to an air supply.

BACKGROUND OF THE DISCLOSURE

A vehicle seat can be ventilated in various ways in order to be able to guide cooled or heated air to a person sitting on the vehicle seat. The ventilation systems conventionally used for this purpose typically have the disadvantage in that they generally do not distinguish whether or not a region of the vehicle seat is in contact with a person's body. Instead, the air is usually discharged in a full-area manner including regions in which there is no contact with the person's body.

It would be desirable to adapt a ventilation function of a vehicle seat individually to a contact area between the vehicle seat and a person sitting thereon.

SUMMARY OF THE DISCLOSURE

According to a first aspect of the present disclosure, a seat component for a vehicle seat is provided. The seat component includes at least one air outlet unit configured to be connected to an air supply, the at least one air outlet unit having at least one flexible air guide funnel and at least one diaphragm valve arranged within the at least one flexible air guide funnel and connected to the at least one flexible air guide funnel such that the at least one diaphragm valve closes the at least one flexible air guide funnel when the at least one flexible air guide funnel is not deformed, and at least partially opens the at least one flexible air guide funnel when the at least one flexible air guide funnel is deformed.

According to a second aspect of the present disclosure, a seat component for a vehicle seat is provided. The seat component includes an air outlet unit configured to be connected to an air supply, the air outlet unit having a flexible air guide funnel and a diaphragm valve is arranged within the flexible air guide funnel and connected to the flexible air guide funnel such that the diaphragm valve closes the air guide funnel when the flexible air guide funnel is not deformed, and at least partially opens the flexible air guide funnel when the flexible air guide funnel is deformed.

According to a third aspect of the present disclosure, a vehicle seat is provided and includes a seat component which forms at least one portion of a backrest or of a seat base of the vehicle seat. The seat component includes at least one air outlet unit configured to be connected to an air supply, the at least one air outlet unit having at least one flexible air guide funnel and at least one diaphragm valve arranged within the at least one flexible air guide funnel and connected to the at least one flexible air guide funnel such that the at least one diaphragm valve closes the at least one flexible air guide funnel when the at least one flexible air guide funnel is not deformed, and at least partially opens the at least one flexible air guide funnel when the at least one flexible air guide funnel is deformed.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a schematic illustration of a further exemplary embodiment of a seat component having air outlet units; and FIG. 4 is a schematic and perspective illustration of a further exemplary embodiment of a vehicle seat configured with the seat component of FIG. 3.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
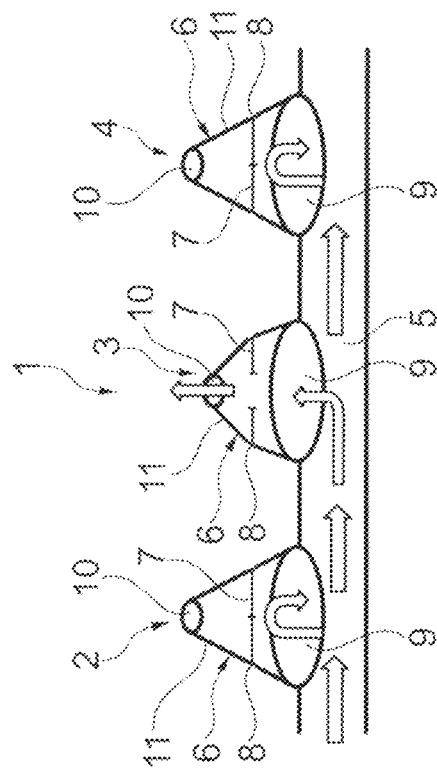
FIG. 1 is a schematic illustration of an exemplary embodiment of a seat component having air outlet units.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a seat component for a vehicle seat and vehicle seat. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In the different figures, identical parts are always provided with the same reference signs, for which reason these parts are generally also described only once.

FIG. 1 shows a schematic illustration of an exemplary embodiment of a seat component 1. The seat component 1 has a plurality of air outlet units 2, 3 and 4 which are configured to be coupled to an air supply (not shown). Each air outlet unit 2 or 3 or 4 is a monolithically produced injection-molded component, according to one embodiment. The air outlet units 2, 3 and 4 are connected to an air supply cushion 5 of the seat component 1 in a communicating manner, the air supply cushion connecting the air outlet units 2, 3 and 4 to the air supply. As an alternative, the seat component 1 may have an air supply duct (not shown) which is connected to the air outlet units 2, 3 and 4 in a communicating manner.

The respective air outlet unit 2 or 3 or 4 has a flexible air guide funnel 6 and a diaphragm valve 7 arranged within the air guide funnel 6. The respective diaphragm valve 7 is connected to the respective air guide funnel 6 in such a way that the diaphragm valve 7 closes the air guide funnel 6 when the air guide funnel 6 is not deformed, as shown in the case of the air outlet units 2 and 4, and at least partially opens the air guide funnel when the air guide funnel 6 is deformed, as shown in the case of the air outlet unit 3. The air flows occurring in this example are indicated in FIG. 1 by flow arrows. Each air guide funnel 6 has, in a connection region to the respective diaphragm valve 7, a material weakening 8 which is arranged on the air guide funnel 6 in an at least partially encircling manner and which is in the form of a groove on an outer side of the air guide funnel 6.

The respective air guide funnel 6 has a large axial end forming an air inlet opening 9 and a small axial end forming an air outlet opening 10. As an alternative, at least one lateral air outlet opening may additionally be arranged on the respective air guide funnel 6, the at least one lateral air outlet opening being arranged on a shell 11 of the air guide funnel 6, as shown in FIG. 3, for example. In an ideal configuration, the lateral air outlet opening should be arranged, as seen in the plane of the drawing, above the diaphragm valve 7.

The seat component 1 may also have at least one mat which may be composed of a flexible foam and on which a dedicated aperture can be formed for each air outlet unit 2 or 3 or 4, the respective air outlet unit 2 or 3 or 4 being able to be at least partially arranged within the dedicated aperture.

In addition, the seat component 1 may have at least one resistance heating element in order to be able to implement a seat heating function.

The seat component 1 may also have at least one air-permeable substance which covers the air outlet units 2, 3 and 4 on the seat surface side.

Figure 2:
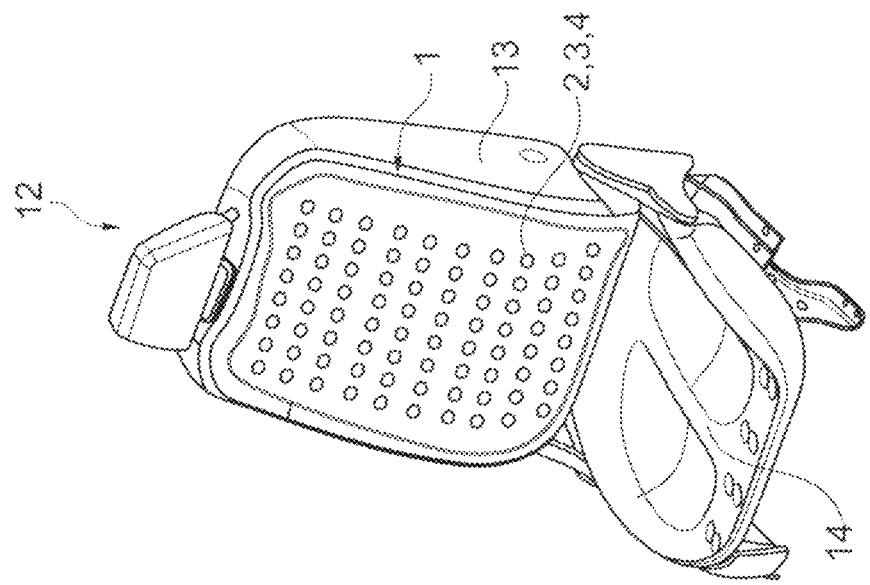
FIG. 2 is a schematic and perspective illustration of an exemplary embodiment of a vehicle seat configured with the seat component of FIG. 1.

FIG. 2 shows a schematic and perspective illustration of an exemplary embodiment of a vehicle seat 12 having a seat component 1 in accordance with the exemplary embodiment shown in FIG. 1. The seat component 1 forms a portion of a backrest 13 of the vehicle seat 12. In addition, or as an alternative, the seat component 1 may form a portion of a seat base 14 of the vehicle seat 12.

FIG. 3 shows a schematic illustration of a further exemplary embodiment of a seat component 15 for a vehicle seat. The seat component 15 has a plurality of air outlet units 16, 17 and 18 which is configured to be connected to an air supply. Each air outlet unit 16 or 17 or 18 is a monolithically produced injection-molded component, according to one embodiment. The air outlet units 16, 17 and 18 are connected to an air supply cushion 5 of the seat component 15 in a communicating manner, the air supply cushion connecting the air outlet units 16, 17 and 18 to the air supply. As an alternative, the seat component 15 may have an air supply duct which may be connected to the air outlet units 16, 17 and 18 in a communicating manner.

The respective air outlet unit 16 or 17 or 18 has a flexible air guide funnel 19 and a diaphragm valve 7 arranged within the air guide funnel 19. The respective diaphragm valve 7 is connected to the respective air guide funnel 19 in such a way that the diaphragm valve 7 closes the air guide funnel 19 when the air guide funnel 19 is not deformed, as shown in the case of the air outlet units 16 and 18, and at least partially opens the air guide funnel when the air guide funnel 19 is deformed, as shown in the example of the air outlet unit 17. The air flows occurring in this example are indicated in FIG. 3 by flow arrows. Each air guide funnel 19 has, in a connection region to the respective diaphragm valve 7, a material weakening 8 which is arranged on the air guide funnel 19 in an at least partially encircling manner and which is in the form of a groove on an outer side of the air guide funnel 19.

The respective air guide funnel 19 has a large axial end forming an air inlet opening 9 and a small axial end forming an air outlet opening 10. Additionally arranged on the respective air guide funnel 19 are two lateral air outlet openings 20 which are arranged so as to be distributed in an encircling manner and which are arranged on a shell 11 of the air guide funnel 19. In an ideal configuration, the lateral air outlet openings 20 are arranged, as seen in the plane of the drawing, above the diaphragm valve 7.

The seat component 1 also has a mat 21 which is composed of a flexible foam and on which a dedicated aperture 22 is formed for each air outlet unit 16 or 17 or 18, the respective air outlet unit 16 or 17 or 18 being at least partially arranged within the dedicated aperture.

In addition, the seat component 1 has a resistance heating element 23 in order to be able to implement a seat heating function. The resistance element 23 runs in a meandering manner through the mat 21, as is shown in FIG. 4, and between the air outlet units 16, 17 and 18.

The seat component 1 also has an air-permeable substance 24 which covers the air outlet units 16, 17 and 18 on the seat surface side.

FIG. 4 shows a schematic and perspective illustration of a further exemplary embodiment of a vehicle seat 25 having a seat component 15 in accordance with the exemplary embodiment shown in FIG. 3. The seat component 15 forms a portion of a backrest 13 of the vehicle seat 25. In addition, or as an alternative, the seat component 15 may form a portion of a seat base 14 of the vehicle seat 25. The meandering profile of the resistance heating element 23 is shown.

According to the disclosure, the seat component of the vehicle seat has the air outlet unit thereof having at least one flexible air guide funnel and at least one diaphragm valve which is arranged within the air guide funnel and which is connected to the air guide funnel in such a way that the diaphragm valve closes the air guide funnel when the air guide funnel is not deformed, and at least partially opens the air guide funnel when the air guide funnel is deformed.

It should be appreciated that the features and measures specified individually in the following description may be combined with one another in any desired technically meaningful way and disclose further configurations of the seat component and vehicle seat. The description additionally characterizes and specifies the seat component and vehicle seat, in particular in conjunction with the figures.

According to one embodiment, the air outlet unit is only opened when the air guide funnel is elastically deformed by mechanical loading. Opening forces which are directed away from one another act on the diaphragm valve due to this elastic deformation of the air guide funnel, as a result of which the diaphragm valve is elastically deformed or pulled apart and opened, with the result that the air guide funnel is opened partially or completely for an air flow through the air guide funnel. If the mechanical loading of the air guide funnel is removed again, the air guide funnel returns to its non-deformed normal state again on account of a restoring force generated by the elastic deformation of the air guide funnel, as a result of which the opening forces no longer act on the diaphragm valve, with the result that the diaphragm valve returns to its deformed closed state again on account of a restoring force generated by the elastic deformation of the diaphragm valve, as a result of which the air guide funnel is closed to the air flow through the air guide funnel.

The air guide funnel is correspondingly mechanically loaded when a person sits on the vehicle seat and pushes with a portion of their body indirectly or directly against the air outlet unit or the air guide funnel thereof. The air outlet unit is thus opened and used for ventilating the vehicle seat exclusively when a person at least partially displaces the air outlet unit. In the case of a multiplicity of air outlet units of the seat component that are arranged so as to be distributed in a grid-like manner, it is in this way possible for a ventilation function of the vehicle seat to be adapted individually to the respective contact area between the vehicle seat and a respective person sitting thereon. This makes very efficient ventilation of the vehicle seat possible, wherein the ventilation function can be used for cooling with cooled air, heating with heated air or simply only for ventilation with ambient air. The disclosure also makes pressure control and/or regulation of an air flow distribution within a vehicle seat possible.

As mentioned above, the seat component according to one embodiment of the disclosure can also have two or more air outlet units which can be arranged so as to be distributed two-dimensionally in a matrix-like or grid-like manner.

The air guide funnel of the respective air outlet unit may be produced partially or completely from an elastic material, such as for example an elastomer, a silicone rubber or the like. The air guide funnel may be of frustoconical form and has a respective opening on its base area and on its top area, which is smaller than the base area. The opening arranged on the top area can be an air outlet opening, whereas the opening arranged on the base area can be an air inlet opening. A material thickness of the respective air guide funnel can be adapted to the mechanical loading by people that is to be expected in that region of the vehicle seat in which the respective air outlet unit is arranged, in that an air guide funnel in a more strongly loaded region has a greater material thickness than an air guide funnel in a less strongly loaded region.

The diaphragm valve may be produced partially or completely from an elastic material, such as for example an elastomer, a silicone rubber or the like. The diaphragm valve may be connected monolithically to the air guide funnel.

The seat component may also have at least one air routing line, via which air can be supplied from the air supply to the air outlet unit. The air routing line then forms a part of the air supply, which may otherwise be arranged in the vehicle seat or at least partially outside the vehicle seat.

The seat component according to the disclosure may be integrated in a portion of a vehicle seat, either in the case of new production or in the course of retrofitting. It is also conceivable for the seat component to be produced as a separate element and to be placed onto the actual vehicle seat.

According to an advantageous configuration, the air guide funnel has, in a connection region to the diaphragm valve, at least one material weakening which is arranged on the air guide funnel in an at least partially encircling manner. The material weakening arranged on the air guide funnel in a partially or completely encircling manner forms a weak point on the air guide funnel at which the air guide funnel first starts to elastically deform when the air outlet unit is mechanically loaded. The material weakening may be formed for example as a reduction in material, in particular a groove which is arranged on an outer side of the air guide funnel. The groove may be embodied in a continuously encircling manner, but may also have an interrupted encircling form. As an alternative, the material weakening may be implemented by a partially or completely encircling portion with reduced material density or reduced stiffness. As a further alternative, the material weakening may be implemented by a partially or completely encircling portion having a different material composition or material combinations which is/are mechanically weaker than the material composition of the rest of the air guide funnel.

According to a further advantageous configuration, the seat component has at least one air supply duct which is connected to the air outlet unit in a communicating manner. The air supply duct can also be used to supply two or more air outlet units with air. The air supply duct may be preferably of flexible form so that the seat comfort is not adversely affected by the presence of the seat component.

A further advantageous configuration provides that the seat component has at least one air supply cushion which is connected to the air outlet unit in a communicating manner. The air supply cushion is preferably used to supply air to a multiplicity of air outlet units which are arranged so as to be distributed in a two-dimensional manner. The air supply cushion is preferably of flexible form so that the seat comfort is not adversely affected by the presence of the seat component.

According to a further advantageous configuration, the air outlet unit is a monolithically produced injection-molded component. This makes it possible to produce the air outlet unit in high quantities in a cost-effective manner using an injection-molding process.

According to a further advantageous configuration, at least two air outlets are arranged on the air guide funnel, of which at least one air outlet is arranged on a shell of the air guide funnel. The one air outlet opening may be the air outlet opening at the smaller axial end or the top area of the air guide funnel. The at least one further air outlet opening is arranged completely on the shell of the air guide funnel in order to also be able to discharge air laterally and thus guide a certain amount of air around or past the respective body part of a person sitting on the vehicle seat. Two or more air outlet openings may also be arranged so as to be distributed in an encircling manner on the shell of the air guide funnel. In an ideal configuration, the air outlet openings may be arranged above the diaphragm, that is to say, also above the groove.

A further advantageous configuration provides that the seat component has at least one mat which is composed of a flexible foam and on which at least one aperture is formed, within which the air outlet unit is at least partially arranged. The foam can impart a sufficient stiffness to the seat component, for example in order to be able to implement a massage function of the vehicle seat, inflatable massage cushions being able to be arranged under the seat component for implementation thereof.

According to a further advantageous configuration, the seat component has at least one resistance heating element. This makes it possible to implement a seat heating function, in particular for the case where no heated air is discharged by use of the seat component. The resistance heating element may for example be a heating wire or a heating plate. The resistance heating element may be arranged below the air outlet unit or between adjacent air outlet units. The resistance heating element may be embedded at least partially in the flexible foam.

According to a further advantageous configuration, the seat component has at least one air-permeable substance which covers the air outlet unit on the seat surface side. The term seat surface means that this is the surface on which the person sits. The substance may be of breathable form. The substance may be of single-layered or multi-layered form. The substance may impart a more appealing appearance to the seat component or a vehicle seat equipped therewith. A flexibility of the substance may be such that air outlet units in the vicinity of the loaded region of the seat component are also opened when the seat component is subjected to loading. The flexibility of the substance can impart a sufficient stiffness to the seat component, for example in order to be able to implement a massage function of the vehicle seat, inflatable massage cushions being able to be arranged under the seat component for implementation thereof.

A vehicle seat may be configured to include the features of the at least one seat component according to one of the aforementioned configurations or a combination of at least two of these configurations with one another, the at least one seat component forming at least one portion of a backrest or of a seat base of the vehicle seat as shown and described. The vehicle seat is correspondingly associated with the advantages mentioned above with regard to the seat component.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seat component for a vehicle seat, the seat component comprising:
   at least one air outlet unit configured to be connected to an air supply, the at least one air outlet unit having at least one flexible air guide funnel and at least one diaphragm valve arranged within the at least one flexible air guide funnel and connected to the at least one flexible air guide funnel such that the at least one diaphragm valve closes the at least one flexible air guide funnel when the at least one flexible air guide funnel is not deformed, and at least partially opens the at least one flexible air guide funnel when the at least one flexible air guide funnel is deformed, wherein the at least one flexible air guide funnel has an axial top end forming an air inlet opening and an axial bottom end forming an air outlet opening, and wherein the at least one flexible air guide funnel has, in a connection region to the at least one diaphragm valve, at least one material weakening formed of solid material with a groove which is arranged on the at least one flexible air guide funnel in an at least partially encircling manner.

2. The seat component according to claim 1, further comprising at least one air supply duct connected to the at least one air outlet unit in a communicating manner.

3. The seat component according to claim 1, further comprising at least one air supply cushion connected to the at least one air outlet unit in a communicating manner.

4. The seat component according to claim 1, wherein the at least one air outlet unit is a monolithically produced injection-molded component.

5. The seat component according to claim 1, wherein at least two air outlets are arranged on the at least one flexible air guide funnel, of which at least one air outlet is arranged on a shell of the at least one flexible air guide funnel.

6. The seat component according to claim 1, further comprising at least one mat which is composed of a flexible foam and on which at least one aperture is formed, within which the at least one air outlet unit is at least partially arranged.

7. The seat component according to claim 1, further comprising at least one resistance heating element.

8. The seat component according to claim 1, further comprising at least one air-permeable substance which covers the at least one air outlet unit on a seat surface side.

9. A seat component for a vehicle seat, the seat component comprising:
an air outlet unit configured to be connected to an air supply, the air outlet unit having a flexible air guide funnel and a diaphragm valve is arranged within the flexible air guide funnel and connected to the flexible air guide funnel such that the diaphragm valve closes the air guide funnel when the flexible air guide funnel is not deformed, and at least partially opens the flexible air guide funnel when the flexible air guide funnel is deformed, wherein the at least one flexible air guide funnel has an axial top end forming an air inlet opening and an axial bottom end forming an air outlet opening, and wherein the at least one flexible air guide funnel has, in a connection region to the at least one diaphragm valve, at least one material weakening formed of solid material with a groove which is arranged on the at least one flexible air guide funnel in an at least partially encircling manner.

10. A vehicle seat comprising:
a seat component which forms at least one portion of a backrest or of a seat base of the vehicle seat, the seat component comprising:
at least one air outlet unit configured to be connected to an air supply, the at least one air outlet unit having at least one flexible air guide funnel and at least one diaphragm valve arranged within the at least one flexible air guide funnel and connected to the at least one flexible air guide funnel such that the at least one diaphragm valve closes the at least one flexible air guide funnel when the at least one flexible air guide funnel is not deformed, and at least partially opens the at least one flexible air guide funnel when the at least one flexible air guide funnel is deformed, wherein the at least one flexible air guide funnel has an axial top end forming an air inlet opening and an axial bottom end forming an air outlet opening, and wherein the at least one flexible air guide funnel has, in a connection region to the at least one diaphragm valve, at least one material weakening formed of solid material with a groove which is arranged on the at least one flexible air guide funnel in an at least partially encircling manner.

11. The vehicle seat according to claim 10, further comprising at least one air supply duct connected to the at least one air outlet unit in a communicating manner.

12. The vehicle seat according to claim 10, further comprising at least one air supply cushion connected to the at least one air outlet unit in a communicating manner.

13. The vehicle seat according to claim 10, wherein the at least one air outlet unit is a monolithically produced injection-molded component.

14. The vehicle seat according to claim 10, wherein at least two air outlets are arranged on the at least one flexible air guide funnel, of which at least one air outlet is arranged on a shell of the at least one flexible air guide funnel.

15. The vehicle seat according to claim 10, further comprising at least one mat which is composed of a flexible foam and on which at least one aperture is formed, within which the at least one air outlet unit is at least partially arranged.

16. The vehicle seat according to claim 10, further comprising at least one resistance heating element.

17. The vehicle seat according to claim 10, further comprising at least one air-permeable substance which covers the at least one air outlet unit on a seat surface side.

* * * * *